Nov. 14, 1933.　　H. L. FERRIS　　1,935,265
STANCHION
Filed May 2, 1929　　2 Sheets-Sheet 1

Inventor:
Henry L. Ferris,
By Dyrenforth, Lee, Chritton & Wiles,
Attys.

Nov. 14, 1933. H. L. FERRIS 1,935,265
STANCHION
Filed May 2, 1929 2 Sheets-Sheet 2
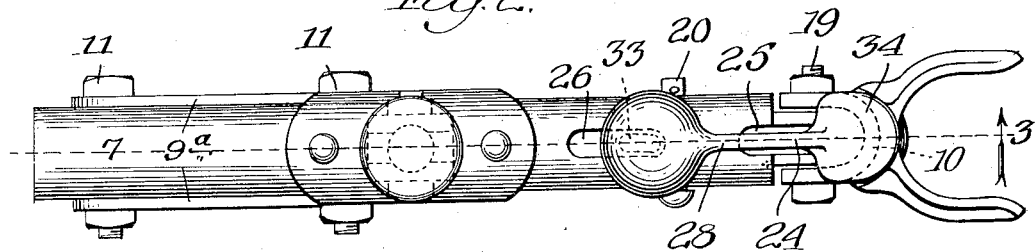
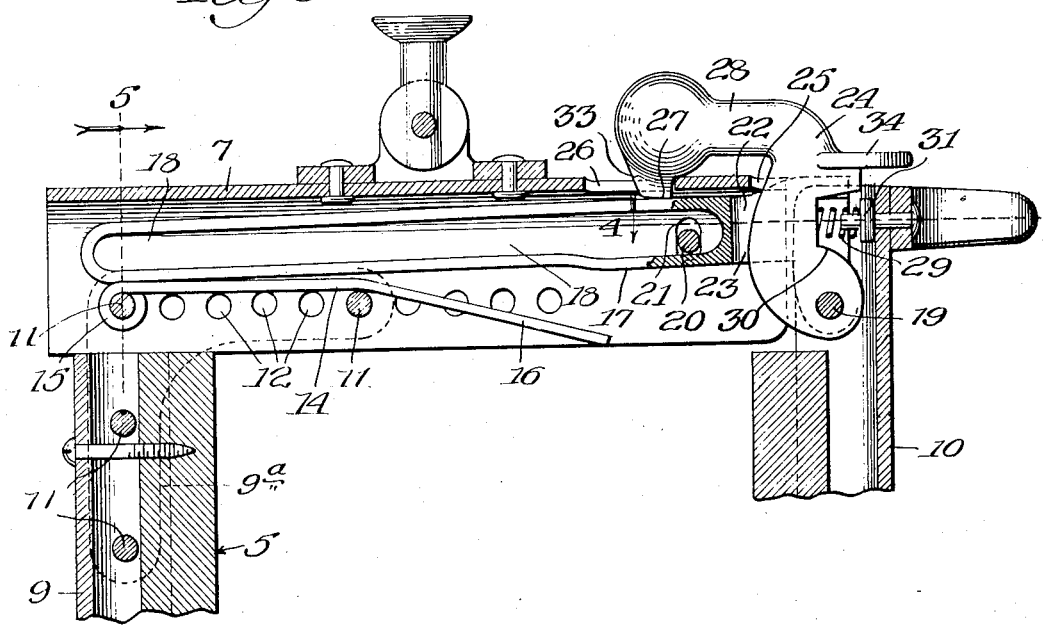
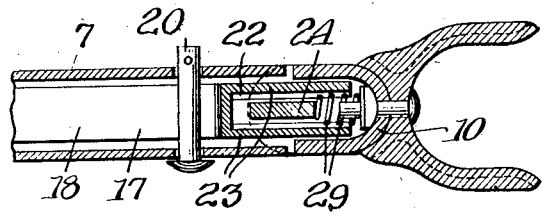
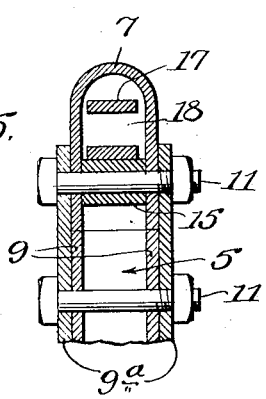
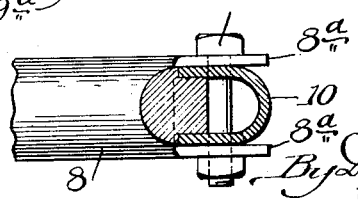
Inventor:
Henry L. Ferris,
By Dyrenforth, Lee, Chritton & Wiles,
Attys.

Patented Nov. 14, 1933

1,935,265

UNITED STATES PATENT OFFICE 1,935,265

STANCHION

Henry L. Ferris, Harvard, Ill.; Howard J. Ferris and Eugene C. Ferris executors of said Henry L. Ferris, deceased, assignors to Starline, Inc., Harvard, Ill., a corporation of Illinois Application May 2, 1929. Serial No. 359,914

9 Claims. (Cl. 119—150)

One of my objects is to provide improvements in the means for releasably locking the movable side of a stanchion in closed position.

Another object is to provide a novel, simple and inexpensive construction of stanchion and more particularly as regards its upper and lower cross-members and the connections between these parts and the non-pivoted side member of the stanchion; and other objects as will be manifest from the following description.

Referring to the accompanying drawings:

Figure 2 is a plan view of the stanchion of Fig. 1.

Figure 3 is a section taken at the line 3 on Fig. 2 and viewed in the direction of the arrow.

Figure 4 is a broken plan section taken at the line 4 on Fig. 3 and viewed in the direction of the arrow.

Figure 5 is a section taken at the line 5 on Fig. 3 and viewed in the direction of the arrow; and Figure 6, an enlarged section taken at the line 6 on Fig. 1 and viewed in the direction of the arrow.

Figure 1:
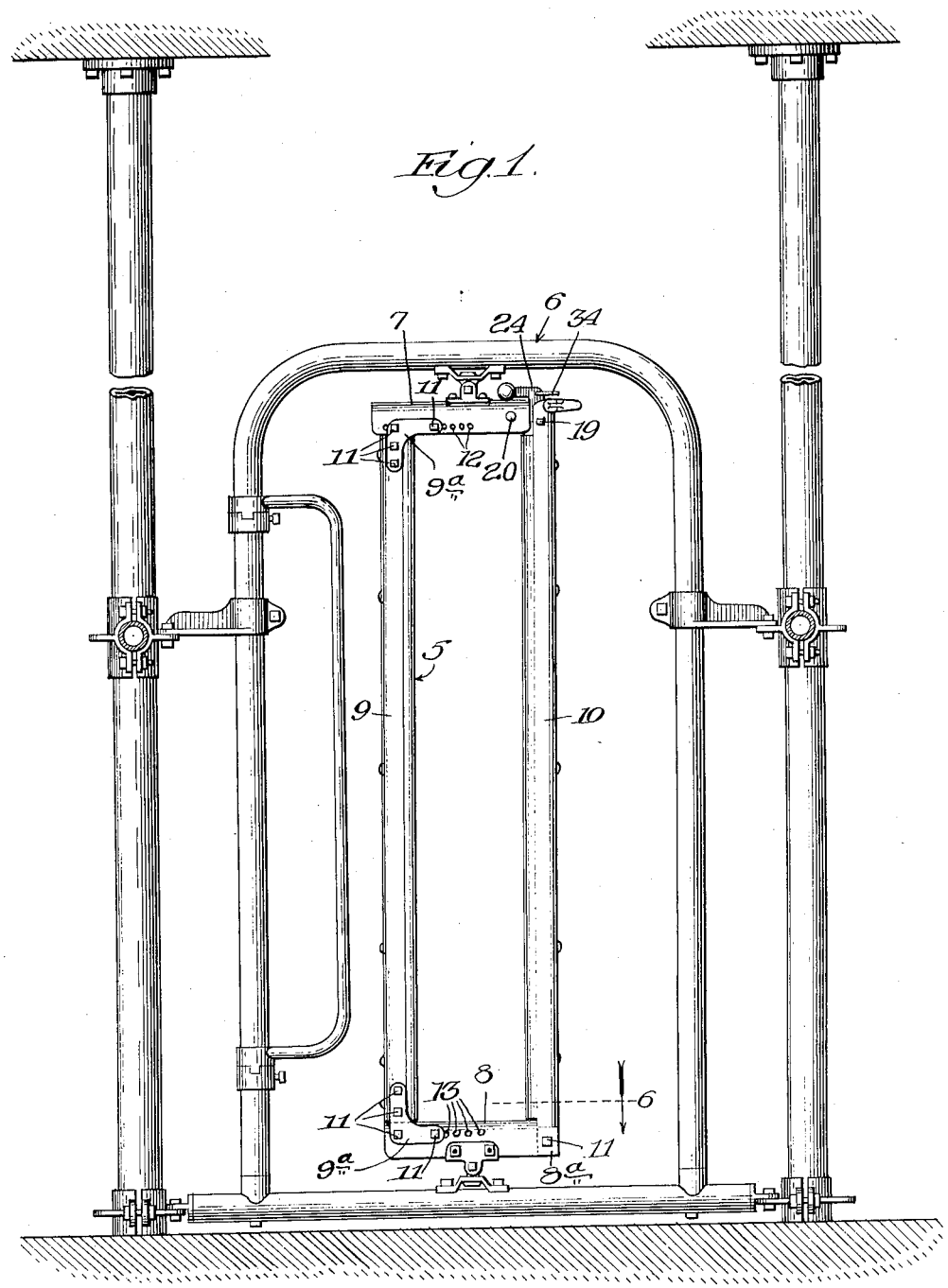
Figure 1 is a view in front elevation of a stanchion embodying my improvements mounted in a stall front.

In the illustrated embodiment of my invention the stanchion represented at 5 is pivotally mounted at its upper and lower ends, to swing in a horizontal plane, in the stationary frame 6 of a stall front.

The stanchion shown comprises top and bottom members 7 and 8, respectively, connected together by means of a fixed side bar 9 and having a movable side bar 10 hingedly connected at 11 to the cross member 8.

The top and bottom cross members 7 and 8 are in the form of inverted channels, the side-bar 9 extending at its upper end in abutting relationship to the under side of the member 7 and at its lower end in abutting relationship to the top side of the member 8.

The bar 9 is connected with the members 7 and 8 by means of angle-plates 9ª arranged at opposite sides of the joints between the bar 9 and the members 7 and 8, and bolts 11 extending through these parts, the members 7 and 8 containing horizontal series of openings 12 and 13, respectively, to receive certain of the bolts 11 thereby permitting of the securing of the bar 9 at different positions along the members 7 and 8 to cause the stanchion to be adjusted for animals having necks of different widths.

Each of the channel members 7 and 8 contains means for preventing the crushing of the channels in the tightening of the bolts 11. The means shown in the upper channel member 7 for this purpose, and which also perform an additional function as hereinafter described, and which may be used in the lower channel member 8, comprise a plate 14 of substantially the same width as the channel, this plate having an eye 15 adjacent the bar 9 at which it is supported on one of the bolts 11 and extending toward the hinged frame-bar 10 and resting on one of the other of these bolts, its terminal end, beyond the last-referred-to bolt, being downwardly inclined, as represented at 16.

The end of the member 8 at which the pivot 11 is located, is preferably formed with spaced-apart lugs 8ª between which the bar 10 at its lower end extends, the pivot-bolt 11 extending through these lugs and the bar 10.

Extending into the channel of the member 7 is a bar 17 which contains an elongated slot 18 and is pivoted on a pin 19 secured to the upper end of the side bar 10. A pin 20 which is loosely mounted at its opposite ends in slots 21 in the sides of the member 7 extends through the slot 18 in the bar 17 and serves as a stop limiting the outward swinging of the side bar 10, the slots 21 permitting of the vertical movement of the pin in the movement of the bar 17.

The outer end of the bar 17 is forked as represented at 22 to provide spaced apart legs 23 between which a latch lever 24 extends, the lower end of this latch lever being pivoted on the pin 19. The cross bar 7 is slotted at one end as represented at 25 to receive the latch lever 24 and inwardly of the slot 25 is slotted as represented at 26 to receive a latching lug 27 depending from the outer end of the horizontal portion 28 of the lever 24. When the side bar 10 is in the closed position represented in the drawings the latch lug 27 extends into the slot 26 thereby interlocking with the adjacent end of this slot and locking the bar 10 in closed position.

Associated with the latch lever 24 is a coil spring 29 shown as extending into a recess 30 in the vertical edge of the lever 24 and bearing at its opposite ends, respectively, against this lever and an abutment 31 secured to the side bar 10, this spring urging the latch lever 24 to locking position. The latch 24 is released, to permit the operator to swing the side bar 10 away from the bar 9 to open the stanchion, by the operator swinging the latch lever 24 to a position in which the latching lug 27 is withdrawn from the slot 26 against the resistance of the spring 29 thereby permitting swinging of the bar 10 toward the right in the drawings.

To move the bar 10 to the closed position shown and lock it in such position, the operator merely swings the bar to the left in the drawings whereupon the latch lever 24 automatically interlocks with the cross member 7 as shown, the forward edge of the lug 27 being preferably inclined as represented at 33 to prevent obstruction to movement of this lever to interlocking position as stated.

In the particular illustrated embodiment of my invention the bar 17 serves not only as a stop limiting counterclockwise swinging movement of the latch lever 24 for maintaining this lever in such position that it will automatically move to a position in which it automatically interlocks with the cross member 7, but also serves as a stop limiting the outward swinging of the bar 10 in the opening of the stanchion, and furthermore serves as a guide for the upper end of the bar 10, in the swinging movements thereof, to ensure the proper registration of the cooperating parts of the latching mechanism in the closed position of the stanchion.

The member 14 not only serves as spacer means for the side-walls of the channel member 7, but also as a guide along which the inner end of the bar 17 is movable ensuring against obstruction to movement of the bar along the channel.

The latch 24 is shown as provided with a lug 34 which not only serves as a guard, preventing the hand of the operator from becoming pinched between the latch 24 and the stanchion frame, but also as a rest for the edge portion of the operator's hand when grasping the outer end of the latch for raising the latter.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A stanchion comprising a frame including a cross member of inverted channel form, a side member in abutting relationship to said cross member, angle plates at opposite sides of the joint between said members, a leg of each angle plate extending along said cross member, bolts securing said plates to said members, a plurality of said bolts extending through each of said above-referred-to legs of said plates, said cross member containing a series of bolt-receiving openings extending lengthwise thereof into which said last-referred-to bolts may be selectively positioned to secure said side member to said cross member in different positions of adjustment along the latter, a second side member pivoted for movement toward and away from said first-named side member, and means for releasably holding said second side member in stanchion-closing position.

2. A stanchion comprising a frame including a top member in the form of an inverted channel containing an opening in its top portion presenting a shoulder and side bars one of which is pivoted for movement toward and away from the other thereof, a guide member pivoted to said side bar and extending into, and slidable in, said channel member, means engaging said side member and supporting it for sliding movement in said channel member, and a latch lever of the second class pivoted on said side bar on an axis coincident with the axis of the pivotal connection between said guide member and side bar and provided with a projection for entering said aperture in locking position with said shoulder, said latch lever being provided with an enlarged portion substantially spherical in cross section adjacent said projection providing a portion to be grasped by the operator for raising said lever out of locking position.

3. A stanchion comprising a frame including a top member and side bars one of which is pivoted for movement toward and away from the other thereof, a second member pivoted to said pivoted bar and having a bifurcated portion, means engaging said second member and holding the latter in a position in which it extends along said top member, and a latch member pivoted on said pivoted bar on an axis coincident with the pivotal axis of said second member and extending through said bifurcated portion and into a position above said second member, said top member and said latch member having portions adapted to interengage and lock said pivoted bar in stanchion-closing position.

4. A stanchion comprising a frame including a hollow top member and side bars one of which is pivoted for movement toward and away from the other thereof, a third bar pivoted at one end to said pivoted side bar and extending at its other end into said top member, means guiding said third bar in the movements of said pivoted side bar, said third bar having a bifurcated portion, a latch lever located in said bifurcated portion and pivoted on said pivoted side bar on an axis coincident with the pivotal axis of said third bar, said top member and latch lever having portions adapted to interengage and lock said pivoted side bar in stanchion-closing position, and a spring for urging said latch lever toward locking position interposed between said latch lever and said pivoted side bar.

5. A stanchion comprising a frame including a top member in the form of an inverted channel and side bars one of which is pivoted for movement toward and away from the other thereof, a second member pivoted to said pivoted side bar, a third member separate from said channel top member and positioned between the side walls of said channel crosswise thereof to space the latter and on which the inner end of said second member is supported, means holding said third member in place, and means for releasably holding said pivoted side bar in stanchion-closing position.

6. A stanchion comprising a frame including a top member and side bars one of which is pivoted for movement toward and away from the other thereof, and a latch pivoted on said pivoted side bar, said latch and top member having portions adapted to interengage and lock said pivoted bar in stanchion-closing position, said latch being so associated with an adjacent portion of said pivoted side bar that the hand of the operator may become pinched between said latch and said portion, and said latch having a portion at one side of its pivot adapted to be grasped for raising the latch out of locking position and a projection at the other side of its pivot extending into a position for guarding against the pinching of the hand of the operator between said latch and said portion of said pivoted side bar in moving the latch to unlocked position.

7. A stanchion comprising a frame including a cross member, side members one of which is pivoted for movement toward and away from the other thereof, angle plates at opposite sides of the joint between said cross member and the other of said side members, a leg of each angle plate extending along said cross member, bolts securing said plates to said cross member and said last-referred-to side member, a plurality of said bolts extending through each of said above-referred-to legs of said plates, spacer means through which certain of said bolts extend, said cross member containing a series of bolt-receiving openings extending lengthwise thereof into which said last-referred-to bolts may be selectively positioned to secure said last-referred-to side member to said cross member in different positions of adjustment along the latter, said spacer means being re-positionable for co-operation with said bolts in the different positions of the latter, and means for releasably holding said pivoted side member in stanchion-closing position.

8. A stanchion comprising a frame including a top member and side bars one of which is pivoted for movement toward and away from the other thereof, a latch lever pivoted to said pivoted side bar, said lever and frame having portions adapted to interengage and lock said pivoted side bar in stanchion-closing position, said frame containing a slot in which said lever is movable, the lever being so associated with walls of said slot that the hand of the operator may become pinched therebetween, and a projection on said lever movable toward said slot in the movement of said lever out of locking position and extending into a position for guarding against pinching of the operator's hand at said slot in said movement of said lever.

9. A stanchion comprising a frame including a top member and side bars one of which is pivoted for movement toward and away from the other thereof, a latch lever pivoted to said pivoted side bar, said lever and frame having portions adapted to interengage and lock said pivoted side bar in stanchion-closing position, said frame containing a slot in which said lever is movable, the lever being so associated with the walls of said slot that the hand of the operator may become pinched therebetween, and a hand-rest-forming projection on said lever movable toward said slot in the movement of said lever out of locking position and extending into a position for guarding against pinching of the operator's hand at said slot in said movement of said lever.

HENRY L. FERRIS.